United States Patent
Loveday et al.

(10) Patent No.: US 10,081,702 B2
(45) Date of Patent: Sep. 25, 2018

(54) POLYETHER POLYOL COMPOSITIONS AND POLYURETHANE FOAMS FORMED THEREFROM

(71) Applicant: Bayer MaterialScience LLC, Pittsburgh, PA (US)

(72) Inventors: Anthony R. Loveday, Weirton, WV (US); Eloy C. Martinez, Pearland, TX (US); James L. Lambach, McMurray, PA (US); Richard Raul Romero, Spring, TX (US); Usama E. Younes, McMurray, PA (US); Ray Joseph Anderson, Spring, TX (US)

(73) Assignee: COVESTRO LLC, Pittsburgh, PA (US)

( * ) Notice: Subject to any disclaimer, the term of this patent is extended or adjusted under 35 U.S.C. 154(b) by 241 days.

(21) Appl. No.: 14/825,608

(22) Filed: Aug. 13, 2015

(65) Prior Publication Data
US 2017/0044301 A1    Feb. 16, 2017

(51) Int. Cl.
*C08G 18/48* (2006.01)
*C08G 18/76* (2006.01)
(Continued)

(52) U.S. Cl.
CPC ......... *C08G 18/4895* (2013.01); *C08G 18/14* (2013.01); *C08G 18/3212* (2013.01); *C08G 18/4812* (2013.01); *C08G 18/4883* (2013.01); *C08G 18/5006* (2013.01); *C08G 18/6677* (2013.01); *C08G 18/7664* (2013.01);
(Continued)

(58) Field of Classification Search
CPC ............ C08G 18/4895; C08G 18/7671; C08G 18/14; C08G 18/4812; C08G 18/3212; C08G 18/7664; C08G 18/6677; C08G 18/5006; C08G 18/4883; C08G 65/2609; C08G 2101/005; C08G 2101/0083; C08J 9/0023; C08J 9/0038; C08J 2375/08; C08L 71/02; C08K 5/521
See application file for complete search history.

(56) References Cited

U.S. PATENT DOCUMENTS 3,085,085 A    4/1963 Wismer et al.
3,153,002 A    10/1964 Wismer et al.
(Continued)

FOREIGN PATENT DOCUMENTS

| CN | 102585138 A | 7/2012 |
| EP | 0903368 A1 | 3/1999 |
| EP | 2803695 A1 | 11/2014 |

OTHER PUBLICATIONS

Lemaistre, J. W. and Seymour, Raymond B.; "The Reaction of Sucrose With Ethylene Oxide"; The Industrial Research Institute, University of Chattanooga, Received Jun. 14, 1948; Presented in part before the Division of Sugar Chemistry at the 112th National Meeting of the American Chemical Society, New York, NY, Sep. 17, 1947; pp. 782-785; Chattam Chemical Co., Chattanooga, Tennessee.

*Primary Examiner* — Peter F Godenschwager
*Assistant Examiner* — Andrew J. Oyer
(74) *Attorney, Agent, or Firm* — Donald R. Palladino

(57) ABSTRACT

Disclosed are compositions that comprise water and a polyether polyol derived from sucrose and an alkylene oxide, as well as polyurethane foam systems comprising such compositions, methods for their production, and the resulting polyurethane foams.

22 Claims, 1 Drawing Sheet

(51) Int. Cl.

| | | |
|---|---|---|
| *C08J 9/00* | (2006.01) | |
| *C08G 18/08* | (2006.01) | |
| *C08K 5/521* | (2006.01) | |
| *C08G 18/32* | (2006.01) | |
| *C08L 71/02* | (2006.01) | |
| *C08G 18/66* | (2006.01) | |
| *C08G 65/26* | (2006.01) | |
| *C08G 18/50* | (2006.01) | |
| *C08G 101/00* | (2006.01) | |

(52) U.S. Cl.
CPC ..... *C08G 18/7671* (2013.01); *C08G 65/2609* (2013.01); *C08J 9/0023* (2013.01); *C08J 9/0038* (2013.01); *C08K 5/521* (2013.01); *C08L 71/02* (2013.01); *C08G 2101/005* (2013.01); *C08G 2101/0083* (2013.01); *C08J 2375/08* (2013.01)

(56) References Cited

U.S. PATENT DOCUMENTS

| | | | |
|---|---|---|---|
| 3,442,888 A | | 5/1969 | Degginger et al. |
| 3,620,985 A | * | 11/1971 | Larkin ............... C08G 18/22 502/155 |
| 4,230,824 A | | 10/1980 | Nodelman |
| 4,430,490 A | | 2/1984 | Doerge |
| 4,451,587 A | | 5/1984 | Keshi et al. |
| 4,642,319 A | * | 2/1987 | McDaniel .......... C08G 18/4213 252/182.24 |
| 4,820,810 A | | 4/1989 | Klein et al. |
| 5,625,045 A | | 4/1997 | Gupta et al. |
| 8,334,035 B2 | | 12/2012 | Nefzger et al. |
| 2002/0120026 A1 | | 8/2002 | Schilling et al. |
| 2006/0100295 A1 | | 5/2006 | Heraldo et al. |
| 2011/0086217 A1 | | 4/2011 | Crain et al. |
| 2013/0030067 A1 | | 1/2013 | Mooney et al. |
| 2014/0179814 A1 | | 6/2014 | Mooney et al. |

* cited by examiner

POLYETHER POLYOL COMPOSITIONS AND POLYURETHANE FOAMS FORMED THEREFROM

FIELD

The present invention relates to compositions that comprise water and a polyether polyol derived from sucrose and an alkylene oxide, as well as to related flame retardant-containing compositions, and methods for their use to produce polyurethane foams.

BACKGROUND

Spray polyurethane foams are formed by combining a polyol component and a polyisocyanate component in the presence of a blowing agent. Polyether polyols are often used in the polyol component. Such polyether polyols are typically made by reacting a polyol with an alkylene oxide in the presence of an alkaline catalyst.

In some cases, a raw, natural-occurring polyol, such as raw sucrose, has been included in the polyol component of a spray polyurethane foam formulation, since raw sucrose can "char" upon burning, thereby acting as a flame retardant. However, the use of large quantities of a raw, naturally-occurring polyol, such as raw sucrose, for this purpose can pose several problems. First, the raw naturally-occurring polyol, such as raw sucrose, in the polyol component of the formulation can precipitate and deposit in shipping containers as well as process equipment, thereby causing equipment damage during the spray application process. Such precipitation can also affect the stoichiometry of the resulting polyurethane spray system, resulting in poor reactivity and foam performance properties. To compensate for poor reactivity, over-catalysts through the use of high amount of an amine catalyst is possible, but this can be undesirable. Thus, it would be desirable to reduce the amount of, or even eliminate, raw sucrose used in such formulations.

Standards for flame spread of spray-applied foam plastic insulation are set forth in International Code Council Evaluation Service ("ICC-ES") Acceptance Criteria ("AC") 377, Appendix X. Currently, to meet the requirements of ICC-ES 377, Appendix X, spray polyurethane foams typically require the application of an ignition barrier over the foam. This ignition barrier can be, for example, ¼" thick plywood or an intumescent coating. The need to apply an ignition barrier over the polyurethane foam is undesirable from, for example, a material cost and labor cost standpoint.

It would be desirable to provide a polyether polyol composition that can be used as part of a spray polyurethane foam formulation that produces a foam that passes the requirements of ICC-ES AC377, Appendix X in the absence of the presence of an ignition barrier applied over the foam and which is less dependent on or, in some cases, completely eliminates, the use of a raw, naturally-occurring polyol, such as raw sucrose, in the spray polyurethane foam formulation to achieve sufficient fire retardency.

SUMMARY

In certain respects, the present invention is directed to polyether polyol compositions. These compositions comprise: (a) at least 10 percent by weight, based on the total weight of the composition, of water; and (b) a polyether polyol that is the reaction product of: (i) sucrose; and (ii) an alkylene oxide; wherein (i) and (ii) are used at a mole ratio of alkylene oxide to sucrose of 1:1 to 4:1, such as 2:1 to 3:1.

The present invention also relates to, among other things, methods for producing polyurethane foam using such compositions, as well as polyurethane foams, including low-density foams, formed from such compositions.

DETAILED DESCRIPTION

Figure 1:
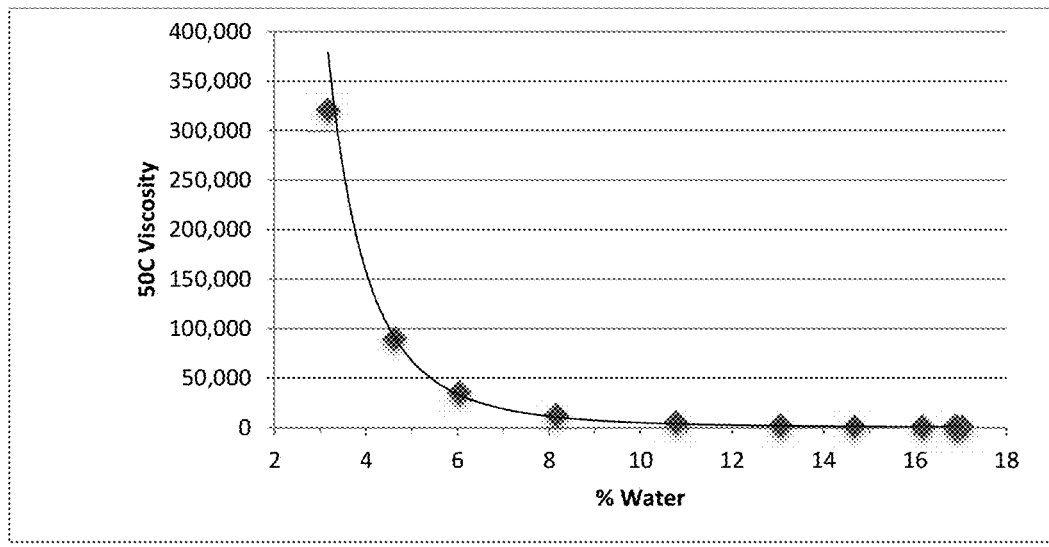
FIG. 1 is a graph of the viscosity (in mPa·s at 25° C.) of a polyether polyol composition produced as in Example 1 at various water contents (in % by weight of the polyether polyol composition)

Various embodiments are described and illustrated in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "certain embodiments," or the like, means that a particular feature or characteristic may be included in an embodiment. Thus, use of the phrase "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, and without limitation, "a flame retardant" means one or more flame retardants, and thus, possibly, more than one flame retardant is contemplated and may be employed or used in an implementation of the described embodiments. Further, the use of a singular noun includes the plural, and the use of a plural noun includes the singular, unless the context of the usage requires otherwise.

Certain embodiments of the present invention are directed to polyether polyol compositions comprising water and a polyether polyol that is the reaction product of (i) sucrose and (ii) an alkylene oxide. As used herein, "sucrose" refers to a crystalline disaccharide having D-fructosyl and D-glucosyl moieties, having the structure:

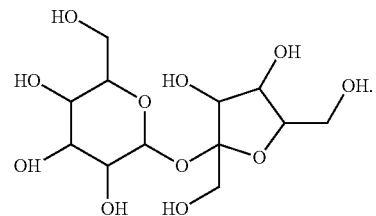 [SMILES: OCC1OC(OC2(CO)OC(CO)C(O)C2O)C(O)C(O)C1O]

The polyether polyols present in the compositions of the present invention are prepared from a relatively high content of sucrose. More particularly, to prepare the polyether polyols, the sucrose and alkylene oxide are used at a mole ratio of alkylene oxide to sucrose of at least 1:1, such as at least 2:1 and no more than 4:1, such as no more than 3:1. In some embodiments, sucrose is used in an amount of at least 50 percent by weight, such as at least 60 percent by weight and no more than 90 percent by weight, such as no more than 80 percent by weight, based on the total weight of sucrose and alkylene oxide used to make the polyether polyol.

The polyether polyols present in the compositions of the present invention are prepared by reacting sucrose with one or more alkylene oxides in the presence of water and an alkali metal hydroxide catalyst ("alkaline catalyst"). In the present invention, water is used in an amount in an amount of at least 10 percent by weight, such as at least 15 percent by weight, based on the total weight of the polyether polyol composition. In certain embodiments, water is used in an amount of no more than 30 percent by weight, such as no more than 20 percent by weight, based on the total weight of the polyether polyol composition.

Examples of alkylene oxides useful in producing the polyether polyols present in the polyether polyol compositions of the present invention include, without limitation, ethylene oxide, propylene oxide, 1,2- and 2,3-butylene oxide, isobutylene oxide, epichlorohydrin, cyclohexene oxide, styrene oxide and $C_5$ to $C_{30}$ α-alkylene oxides, as well as mixtures of these alkylene oxides. The alkylene oxides may be added as mixtures to produce random copolymer structures or added sequentially to produce block copolymer structures. In certain embodiments, the alkylene oxide comprises ethylene oxide and propylene oxide, which, in some cases, are added as a mixture. In some of these embodiments, the weight ratio of ethylene oxide to propylene oxide that is used is at least 1:1, such as at least 1.5:1, at least 2:1 or at least 2.3:1 and no more than 9:1, such as no more than 5:1 or no more than 4:1.

Any alkaline material capable of catalyzing the alkoxylation reaction may be used to prepare the polyether polyol. Specific examples of suitable alkaline catalysts include, but are not limited to, potassium hydroxide, cesium hydroxide and sodium hydroxide. In some embodiments of the present invention, in preparing the polyether polyol, the alkaline catalyst is added to a mixture of sucrose and water, prior to the addition of any alkylene oxide. In certain embodiments, the alkaline catalyst is used in an amount of 0.1 to 3 percent by weight, such as 0.1 to 1 percent by weight or 0.3 to 0.7 percent by weight, based on the total weight of sucrose and alkylene oxide used to prepare the polyether polyol.

In certain embodiments, the alkoxylation reaction occurs by contacting sucrose with the alkylene oxide(s) at an elevated temperature in the range of, for example, from 90 to 180° C. under moderately elevated pressure, such as 1.5 to 5 atmospheres, in the presence of the alkaline catalyst and the water.

After the polyether polyol has been prepared, the resultant reaction mixture that contains the alkaline catalyst may be neutralized with, for example, a hydroxy-carboxylic acid. Neutralization may be accomplished by mixing the hydroxy-carboxylic acid and reaction mixture at an elevated temperature, for example around 90° C., with stirring. Neutralization need not be exact neutrality and the reaction mixture may be maintained at a basic or acidic pH, such as a pH of from 2 to 9. In certain embodiments, the acid is added at a level of 0.70 to 1.30, such as 1.00 to 1.10 equivalents of carboxylic acid per equivalent of the alkali metal hydroxide used for the alkoxylation. The neutralized catalyst is desirably, although not necessarily, soluble in the polyether polyol so that the resulting polyether polyol composition may be used in polyurethane foam-forming equipment without subsequent treatment and without generating large amounts of solid waste.

Examples of hydroxy carboxylic acids useful for such neutralization include, without limitation, lactic acid, salicylic acid, substituted salicylic acids such as 2-hydroxy 3-methyl benzoic acid, 2-hydroxy 4-methyl benzoic acid and combinations of these acids.

The resulting polyether polyol composition contains water in an amount of at least 10 percent by weight, such as at least 15 percent by weight, based on the total weight of the composition. In certain embodiments, the polyether polyol composition contains water in an amount of no more than 30 percent by weight, such as no more than 20 percent by weight, based on the total weight of the composition. The presence of water in such amounts provides a composition that has a viscosity that is sufficiently low that the composition is convenient for use in spray foam application equipment but the water is not present to an extent that results in an undesirable lowering of the functionality, and as a result, reactivity, of the polyether polyol due to reaction of water with the alkylene oxide. In certain embodiments, the polyether polyol composition has a viscosity at 25° C. of at least 1,000 mPa·s, such as at least 3,000 mPa·s or at least 4,000 mPa·s and not more than 10,000 mPa·s, such as not more than 7,000 mPa·s or no more than 6,000 mPa·s, when measured at 25° C. according to ASTM D4878 using a Brookfield RV-DVII viscometer with the small sample adapter and a #21 spindle.

In certain embodiments of the present invention, none of the water is removed prior to use of the polyether polyol to form a polyurethane. The neutralized polyether polyol composition of the present invention is, in certain embodiments, clear, i.e., free from haze and may be used directly in processes for the production of polyurethane foams. In certain embodiments, the polyether polyol composition has a Gardner color (ASTM D1544) of 8 or less or 6 or less.

In certain embodiments, the polyether polyol that is produced has a hydroxyl number of at least 400, at least 500, at least 600, or, in some cases at least 650 and/or no more than 1,000, such as no more than 900, no more than 800 or no more than 750, measured according to ASTM D4274-11. In certain embodiments, the polyether polyol that is produced has an arithmetically calculated functionality of at least 5.2, such as at least 5.5 or at least 6.0 and no more than 7.7, such as no more than 7.0 or no more than 6.5. As will be appreciated, the arithmetically calculated functionality of a polyol is based on resin solids and is calculated by adding the hydroxyl equivalents of the reacted water with the hydroxyl equivalents of the reacted sucrose divided by the hydroxyl equivalents of the reacted water multiplied by its functionality (2) plus the hydroxyl equivalents of the reacted sucrose multiplied by its functionality (8). The amount of reacted water is calculated by analyzing, using gas chromatography, the weight percent of glycol in the resultant polyol.

Other ingredients can be included in the polyether polyol composition to make it suitable for combination with a polyisocyanate to form a flame retardant polyurethane foam. For example, in certain embodiments, the present invention is directed to a flame retardant-containing polyether polyol composition comprising: (a) at least 10 percent by weight, such as at least 15 percent by weight, of water; (b) a polyether polyol that is the reaction product of: (i) sucrose; and (ii) an alkylene oxide; wherein (i) and (ii) are used at a mole ratio of alkylene oxide to sucrose of 1:1 to 4:1, such as 2:1 to 3:1; and (c) a flame retardant composition.

As indicated, water is present in the flame retardant-containing polyether polyol compositions of the present invention in an amount of at least 10 percent by weight, such as at least 15 percent by weight, based on the total weight of the flame retardant-containing polyether polyol composition. In certain embodiments, water is present in such flame retardant-containing polyether polyol compositions in an amount of no more than 30 percent by weight, such as no more than 25 percent by weight or, in some cases, no more than 20 percent by weight, based on the total weight of the flame-retardant polyether polyol composition. As will be appreciated, in certain embodiments, additional water is added upon combination of the polyether polyol composition described above with other ingredients present in the flame retardant-containing polyether polyol composition, in order to achieve an amount of water within the aforementioned ranges in the flame retardant-containing polyether polyol composition.

In certain embodiments, the polyether polyol (b) is present in an amount of at least 10 percent by weight, such as at least 15 percent by weight or, in some cases, at least 20 percent by weight, based on the total weight of the flame retardant-containing polyether polyol composition. In certain embodiments, the polyether polyol (b) is present in an amount of no more than 35 percent by weight, such as no more than 30 percent by weight, or, in some cases, no more than 25 percent by weight, based on the total weight of the flame retardant-containing polyether polyol composition.

As indicated, the flame retardant-containing polyether polyol composition comprises a flame retardant composition. More particularly, in certain embodiments, the flame retardant composition comprises (i) a brominated flame retardant, such as a brominated polyol and (ii) a phosphonated flame retardant, such as a halogenated, such as chlorinated, phosphate.

In certain embodiments, the brominated flame retardant comprises a brominated polyether polyol of the general formula (I):

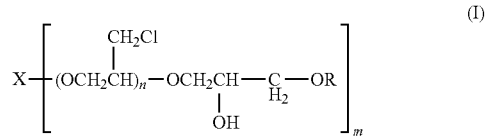

in which n is a number of 0 to 7, m is a number of 2 to 3; X is a saturated or unsaturated brominated polyol residue; and R is hydrogen or an alkyl group having 1 to 5 carbon atoms. Specific examples of suitable brominated polyether polyols are commercially available as Ixol® B-251 and Ixol® M-125 from Solvay Fluorides LLC, which are believed to be produced using the procedure described U.S.

Pat. Nos. 4,020,024, 4,067,911 and 4,072,638. Other suitable brominated flame retardants include, but are not limited to, 3,4,5,6-tetrabromophthalic acid, tribromoneopentyl alcohol, 1,3-propanediol, 2,2-bis(bromomethyl), and pentabromophenyl ether, among others, including mixtures of two or more thereof. Suitable commercially available brominated flame retardants also include those available from ICL Industrial Products as the SaFRon® (6000 Series) brominated flame retardants. Mixtures of two or more of such brominated flame retardants can be used. In certain embodiments, the brominated flame retardant is not phosphonated.

Specific examples of suitable phosphonates, such as halogenated phosphates, include, without limitation, tris-(2-chloroethyl)phosphate, tris-(2-chloroisopropyl)phosphate (TCPP), tris(1,3-dichloroisopropyl)phosphate, tris-(2,3-dibromopropyl)phosphate and tetrakis-(2-chloroethyl) ethylene diphosphate, Diethyl Bis-(2-hydroxyethyl)-aminomethylphosphonate, tris-(1-chloro-2-propyl) phosphate, phosphoric acid, triethyl ester, polymer with oxirane and phosphorus oxide (P205), triethyl phosphate, including mixtures of two or more thereof.

In certain embodiments, the relative weight ratio of brominated flame retardant and phosphonated flame retardant used in the flame retardant-containing polyether polyol composition is within the range of 1:4 to 4:1, such as 1:3 to 3:1 or 1:2 to 2:1, such as 1:1.5 to 1.5:1 or, in some cases 1.2:1 to 1:1.2 or 1.1:1 to 1:1.1. In certain embodiments, the total amount of flame retardant in the flame retardant-containing polyether polyol composition is at least 20 percent by weight, such as at least 30 percent by weight and no more than 50 percent by weight, such as no more than 40 percent by weight, based on the total weight of the flame retardant-containing polyether polyol composition.

In addition, the flame retardant-containing polyether polyol composition may include any of a variety of optional ingredients.

For example, in certain embodiments, the flame retardant-containing polyether polyol composition comprises a surfactant to, for example, stabilize the foaming reaction mixture until it obtains rigidity. Such surfactants often comprise a liquid or solid organosilicon compound, a polyethylene glycol ether of a long chain alcohol, a tertiary amine, an alkanolamine salt of a long chain alkyl acid sulfate ester, an alkylsulfonic ester, or an alkylarylsulfonic acid, or a mixture thereof. Such surfactants are employed in amounts sufficient to stabilize the foaming reaction mixture against collapse and the formation of large and uneven cells. Often, 0.5 to 10 parts by weight of the surfactant per 100 parts of the flame retardant-containing polyether polyol composition are sufficient.

One or more urethane catalysts are also often used in the flame retardant-containing polyether polyol composition. Any suitable urethane catalyst may be used including the known tertiary amine compounds and organometallic compounds. Examples of suitable tertiary amine catalysts include, without limitation, triethylenediamine, N-methylmorpholine, pentamethyl diethylenetriamine, dimethylcyclohexylamine, tetra-methylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include, without limitation, organomercury, organolead, organoferric and organotin catalysts, with organotin catalysts being preferred. Suitable organotin catalysts include, without limitation, tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount which measurably increases the rate of reaction of the polyisocyanate. Typical amounts are about −0.1 to about 10.0 part of catalyst per 100 parts by weight of polyol. Examples of such catalysts include the potassium salts of carboxylic acids such as potassium octoate, and the tertiary amine N,N',N"-tris(3-dimethylaminopropyl) hexahydros-triazine.

In certain embodiments, the flame-retardant containing polyether polyol composition of the present invention comprises raw sucrose. As used herein, the term "raw sucrose" means sucrose that has not been reacted with another material. When used, however, it is desirable that the amount of raw sucrose in the flame retardant-containing polyether polyol composition is not more than 20 percent by weight, such as not more than 15 percent by weight or, in some cases, not more than 10 percent by weight, based on the total weight of the flame retardant-containing polyether polyol composition. Moreover, in certain embodiments, the polyether polyol described above and raw sucrose are present in the flame retardant-containing polyether polyol composition at a relative weight ratio of at least 1:1, such as at least 2:1, or in some cases, at least 2.4:1. It has, however, been surprisingly discovered that raw sucrose has not precipitated out of flame retardant-containing composition of the present invention even when the polyether polyol described above and raw sucrose are present in certain such compositions at a relative weight ratio of as little as 1:2.5.

As indicated, it is desirable that the amount of raw sucrose in the flame retardant-containing polyether polyol compositions of the present invention be low. In some cases, for example, the flame retardant-containing polyether polyol compositions of the present invention are substantially, or, in some cases, completely free of raw sucrose. As used herein, "substantially free of raw sucrose" means that the flame retardant-containing polyether polyol composition comprises no more than 2 percent by weight, such as no more than 1 percent by weight, of raw sucrose. In certain embodiments, raw sucrose is not intentionally added to the flame retardant-containing polyether polyol composition.

In fact, it has been surprisingly discovered that the foregoing flame retardant-containing polyether polyol compositions, which include water, the polyether polyol described above, and the particular flame retardant composition described above, each in amounts within the ranges described above, when combined with a polyisocyanate, allows for production of a spray applied foam that passes the requirements of ICC-ES AC377, Appendix X in the absence of the presence of an ignition barrier applied over the foam. As indicated, in certain embodiments, such a foam is achieved with a reduced amount, or substantial or complete elimination of, raw sucrose in the flame retardant-containing polyether polyol composition.

In certain embodiments, therefore, the present invention is directed to methods for producing a polyurethane foam, comprising: (1) combining the flame retardant-containing polyether polyol composition described above with a polyisocyanate to form a polyurethane-forming composition, and (2) spraying the polyurethane-forming composition onto a substrate. In certain embodiments, the resulting foam is a rigid foam which can be particularly suitable for use as insulating foam in architectural (wall and roofing), automotive, appliance, and other applications.

As indicated, to form the polyurethane foam, the flame retardant-containing polyether polyol composition is combined with an organic polyisocyanate. Any of the known organic polyisocyanates may be used in the present invention. Suitable polyisocyanates include aromatic, aliphatic and cycloaliphatic poly-isocyanates and combinations thereof. Representative of these types are diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, the isomers of hexahydrotoluene diisocyanate, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyldiphenylpropane-4,4'-diisocyanate; triisocyanates, such as 2,4,6-toluene triisocyanate; and polyisocyanates, such as 4,4'-dimethyldiphenylmethane-2,2',5,5'-tetraisocyanate and the polymethylene polyphenylisocyanates.

A crude polyisocyanate may also be used in making polyurethanes, such as the crude toluene diisocyanate obtained by the phosgenation of a mixture of toluene diamines. Such undistilled or crude toluene polyisocyanates are disclosed in U.S. Pat. No. 3,215,652, for example. Similarly, undistilled polyisocyanates, such as methylene bridged polyphenyl-polyisocyanates can be used and are obtained by the phosgenation of polyphenylpolymethylenepolyamines obtained by the known process of the condensation of aromatic amines such as aniline with formaldehyde.

Suitable modified diisocyanates or polyisocyanates may be obtained by chemical reaction of diisocyanates and/or polyisocyanates. Modified isocyanates useful in the practice of the present invention include, without limitation, isocyanates containing ester groups, urea groups, biuret groups, allophanate groups, carbodiimide groups, isocyanurate groups, uretdione groups and/or urethane groups.

In certain embodiments of the present invention, the polyisocyanate comprises a methylene-bridged polyphenyl polyisocyanate and/or a prepolymer of a methylene-bridged polyphenyl polyisocyanate having an average functionality of from 2.0 to 3.5, such as 2.1 to 3.1, isocyanate moieties per molecule and an NCO content of from 28 to 34% by weight, due to their ability to cross-link the polyurethane. The polyisocyanate and polyol are often combined in relative volume ratio of 1.5:1 to 1:1.5, such as 1.1:1 to 1:1.1.

As indicated, because the spray polyurethane-forming foam compositions according to the present invention include the polyether polyol composition of the present invention, water acts as a blowing agent for producing the foam. In addition to water, it is also possible to use other blowing agents, including hydrofluorocarbons, such as 1,1-dichloro-1-fluoroethane (HCFC-141b), 1-chloro-1,1-difluoroethane (HCFC-142b), chlorodifluoro-methane (HCFC-22), 1,1,1,3,3-pentafluoro-propane (HFC-245fa), 1,1,1,2-tetrafluoroethane (HFC-134a), 1,1,1,3,3,3-hexafluoropropane (HFC-236fa), 1,1,2,3,3,3-hexafluoropropane (HFC-236ea), 1,1,1,4,4,4-hexafluorobutane (HFC-356mffm), perfluorinated hydrocarbons, such as perfluoropentane or perfluorohexane, and $C_3$ and $C_4$ polyfluoroalkenes (including, but not limited to, any isomers of 1-chloro-3,3,3-trifluoropropene and 2-chloro-3,3,3-trifluoropropene, 1,1,1,4,4,4-hexafluoro-2-butene), and hydrocarbons, such as isomers of pentane and cyclopentane, or mixtures of any of the above. If any other blowing agents are included, such other blowing agent are often not be employed in an amount greater than 2% by weight, based on the total weight of the flame retardant-containing polyether polyol composition. In certain embodiments, water is the sole blowing agent used. In some embodiments, the blowing agent composition may comprise a mixture of two or more of water and a $C_3$ and/or $C_4$ polyfluoroalkene, such as those mentioned above.

In certain embodiments, the amount of blowing agent used in the polyurethane-forming composition is sufficient to produce a foam having a density, as determined by ASTM D-1622, of no more than 160 kg/m$^3$, such as no more than 80 kg/m$^3$, no more than 60 kg/m$^3$, or, in some cases, no more than 50 kg/m$^3$ or, in some cases, no more than 22.4 kg/m$^3$. In some cases, such foams have a density of at least 5 kg/m$^3$, such as at least 6.4 kg/m$^3$, such as at least 8 kg/m$^3$ or, in some cases, at least 10 kg/m$^3$. In certain embodiments, the foam is a low density foam. As used herein, "low density foam" means a foam having a density, as determined by ASTM D-1622, of 6.4 kg/m$^3$ to 22.4 kg/m$^3$. In certain embodiments, the foam is an open cell foam having a density of 6.4 kg/m$^3$ to 8 kg/m$^3$. In certain embodiments, the foam has an open cell content of at least 90%, measured according ASTM D6226.

The foams can be prepared by any of a variety of methods. In certain embodiments, a rigid foam may be produced using a one-step ("one-shot") process by reacting all of the ingredients together at once. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

In certain embodiments, the polyurethane-forming compositions described herein form a foam having a Class B rating (flame spread index of 26-75), determined according to the ASTM E 84 test. In other embodiments, however, the polyurethane-forming compositions described herein form a foam having a Class A rating (flame spread index of 0-25), determined according to the ASTM E 84 test.

Moreover, as indicated earlier, the polyurethane-forming compositions described herein can for a foam that pass the ACC 377, Appendix X test, even when the foam is not covered or coated with, for example, an ignition barrier layer.

The polyurethane foams of this invention are useful in a wide range of applications. Accordingly, not only can rigid appliance insulating foam be prepared but rigid appliance insulating foam, rigid insulating board stock, laminates and many other types of rigid foam can easily be prepared according to this invention. In some cases, the foams are used on a building substrate, such as a wall, floor, or ceiling, and may be particularly suitable for use where application of an ignition barrier layer is difficult or inconvenient, such as in attic and crawl spaces.

As will be appreciated from the foregoing description, certain embodiments of the present invention are directed to polyether polyol compositions comprising: (a) at least 10 percent by weight, based on the total weight of the composition, of water; and (b) a polyether polyol that is the reaction product of: (i) sucrose; and (ii) an alkylene oxide; wherein (i) and (ii) are used at a mole ratio of alkylene oxide to sucrose of 1:1 to 4:1.

In certain embodiments, the present invention is directed to a polyether polyol composition of the previous paragraph, wherein the sucrose and alkylene oxide are used at a mole ratio of alkylene oxide to sucrose of at least 2:1.

In some embodiments, the present invention is directed to a polyether polyol composition of either of the previous two paragraphs, wherein the sucrose and alkylene oxide are used at a mole ratio of alkylene oxide to sucrose of no more than 3:1.

In other embodiments, the present invention is directed to a polyether polyol composition of any of the previous three paragraphs wherein sucrose is used in an amount of at least 50 percent by weight, such as at least 60 percent by weight and no more than 90 percent by weight, such as no more than 80 percent by weight, based on the total weight of sucrose and alkylene oxide used to make the polyether polyol.

In certain embodiments, the present invention is directed to a polyether polyol composition of any of the previous four paragraphs, wherein water is present in an amount of at least 15 percent by weight, based on the total weight of the polyether polyol composition and/or no more than 30 percent by weight, such as no more than 20 percent by weight, based on the total weight of the polyether polyol composition.

In some embodiments, the present invention is directed to a polyether polyol composition of any of the previous five paragraphs, wherein the alkylene oxide comprises ethylene oxide and propylene oxide, such as where the weight ratio of ethylene oxide to propylene oxide that is used is at least 1:1, such as at least 1.5:1, at least 2:1 or at least 2.3:1 and no more than 9:1, such as no more than 5:1 or no more than 4:1.

In certain embodiments, the present invention is directed to a polyether polyol composition of any of the previous six paragraphs, wherein the composition has a viscosity at 25° C. of at least 1,000 mPa·s, such as at least 3,000 mPa·s or at least 4,000 mPa·s and not more than 10,000 mPa·s, such as not more than 7,000 mPa·s or no more than 6,000 mPa·s, when measured at 25° C. according to ASTM D4878 using a Brookfield RV-DVII viscometer with the small sample adapter and a #21 spindle.

In other embodiments, the present invention is directed to a polyether polyol composition of any of the previous seven paragraphs, wherein the polyether polyol has a hydroxyl number of at least 400, at least 500, at least 600, or, in some cases at least 650 and/or no more than 1,000, such as no more than 900, no more than 800 or no more than 750, measured according to ASTM D4274-11.

In certain embodiments, the present invention is directed to a polyether polyol composition of any of the previous eight paragraphs, wherein the polyether polyol has an arithmetically calculated functionality of at least 5.2, such as at least 5.5 or at least 6.0 and no more than 7.7, such as no more than 7.0 or no more than 6.5.

In some embodiments, the present invention is directed to a flame retardant-containing polyether polyol composition comprising: (a) at least 10 percent by weight water, based on the total weight of the flame retardant-containing polyether polyol composition; (b) a polyether polyol that is the reaction product of: (i) sucrose; and (ii) an alkylene oxide; wherein (i) and (ii) are used at a mole ratio of alkylene oxide to sucrose of 1:1 to 4:1; and (c) a flame retardant composition.

In certain embodiments, the present invention is directed to a flame retardant-containing polyether polyol composition of the previous paragraph, wherein the water is present in an amount of at least 15 percent by weight, based on the total weight of the flame retardant-containing polyether polyol composition and/or no more than 30 percent by weight, such as no more than 25 percent by weight or, in some cases, no more than 20 percent by weight, based on the total weight of the flame-retardant polyether polyol composition.

In some embodiments, the present invention is directed to a flame retardant-containing polyether polyol composition of either of the previous two paragraphs, wherein the sucrose and alkylene oxide are used at a mole ratio of alkylene oxide to sucrose of at least 2:1 and/or no more than 3:1.

In other embodiments, the present invention is directed to a flame retardant-containing polyether polyol composition of any of the previous three paragraphs wherein sucrose is used in an amount of at least 50 percent by weight, such as at least 60 percent by weight and no more than 90 percent by weight, such as no more than 80 percent by weight, based on the total weight of sucrose and alkylene oxide used to make the polyether polyol.

In certain embodiments, the present invention is directed to a flame retardant-containing polyether polyol composition of any of the previous four paragraphs, wherein the alkylene oxide comprises ethylene oxide and propylene oxide, such as where the weight ratio of ethylene oxide to propylene oxide that is used is at least 1:1, such as at least 1.5:1, at least 2:1 or at least 2.3:1 and no more than 9:1, such as no more than 5:1 or no more than 4:1.

In other embodiments, the present invention is directed to a flame retardant-containing polyether polyol composition of any of the previous five paragraphs, wherein the polyether polyol has a hydroxyl number of at least 400, at least 500, at least 600, or, in some cases at least 650 and/or no more than 1,000, such as no more than 900, no more than 800 or no more than 750, measured according to ASTM D4274-11.

In certain embodiments, the present invention is directed to a flame retardant-containing polyether polyol composition of any of the previous six paragraphs, wherein the polyether polyol has an arithmetically calculated functionality of at least 5.2, such as at least 5.5 or at least 6.0 and no more than 7.7, such as no more than 7.0 or no more than 6.5.

In some embodiments, the present invention is directed to a flame retardant-containing polyether polyol composition of any of the previous seven paragraphs, wherein the polyether polyol is present in an amount of at least 10 percent by weight, such as at least 15 percent by weight, based on the total weight of the flame retardant-containing polyether polyol composition and/or no more than 35 percent by weight, such as no more than 30 percent by weight, or, in some cases, no more than 25 percent by weight, based on the total weight of the flame retardant-containing polyether polyol composition.

In other embodiments, the present invention is directed to a flame retardant-containing polyether polyol composition of any of the previous eight paragraphs, wherein the flame retardant composition comprises (i) a brominated flame retardant, such as brominated polyol and (ii) a phosphonated flame retardant, such as a chlorinated, phosphate, such as where the halogenated polyol comprises a brominated polyether polyol of the general formula:

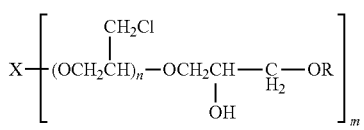

in which n is a number of 0 to 7, m is a number of 2 to 3; X is a saturated or unsaturated brominated polyol residue; and R is hydrogen or an alkyl group having 1 to 5 carbon atoms and/or wherein the phosphonated flame retardant comprises tris-(2-chloroethyl)phosphate, tris-(2-chloroisopropyl)phosphate (TCPP), tris(1,3-dichloroisopropyl)phosphate, tris-(2,3-dibromopropyl)phosphate and tetrakis-(2-chloroethyl) ethylene diphosphate, or a mixture thereof, such as where the relative weight ratio of the brominated flame retardant and the phosphonated flame retardant used in the composition is within the range of 1:4 to 4:1, such as 1:3 to 3:1 or 1:2 to 2:1, such as 1:1.5 to 1.5:1 or, in some cases 1.2:1 to 1:1.2 or 1.1:1 to 1:1.1.

In some embodiments, the present invention is directed to a flame retardant-containing polyether polyol composition of any of the previous nine paragraphs, wherein the total amount of flame retardant in the flame retardant-containing polyether polyol composition is at least 20 percent by weight, such as at least 30 percent by weight and no more than 50 percent by weight, such as no more than 40 percent by weight, based on the total weight of the flame retardant-containing polyether polyol composition.

In other embodiments, the present invention is directed to a flame retardant-containing polyether polyol composition of any of the previous ten paragraphs, wherein the flame retardant-containing polyether polyol composition further comprises a surfactant and/or a urethane catalyst.

In certain embodiments, the present invention is directed to a flame retardant-containing polyether polyol composition of any of the previous eleven paragraphs, wherein the flame retardant-containing polyether polyol composition further comprises raw sucrose, such as where the amount of raw sucrose in the flame retardant-containing polyether polyol composition is not more than 20 percent by weight, such as not more than 15 percent by weight or, in some cases, not more than 10 percent by weight, based on the total weight of the flame retardant-containing polyether polyol composition and/or where the polyether polyol and raw sucrose are present in the flame retardant-containing polyether polyol composition at a relative weight ratio of at least 1:1, such as at least 2:1, or in some cases, at least 2.4:1, whereas in other embodiments, the present invention is directed to a flame retardant-containing polyether polyol composition of any of the previous twelve paragraphs, wherein the flame retardant-containing polyether polyol compositions is substantially, or, in some cases, completely free of raw sucrose.

In yet other embodiments, the present invention is directed to methods for producing a polyurethane foam, comprising: (1) combining a flame retardant-containing polyether polyol composition of any of the previous thirteen paragraphs with a polyisocyanate to form a polyurethane-forming composition, and (2) spraying the polyurethane-forming composition onto a substrate.

In still other embodiments, the present invention is directed to a method of the previous paragraph, wherein the polyisocyanate comprises a methylene-bridged polyphenyl polyisocyanate and/or a prepolymer of a methylene-bridged polyphenyl polyisocyanate having an average functionality of from 2.0 to 3.5, such as 2.1 to 3.1, isocyanate moieties per molecule and an NCO content of from 28 to 34% by weight.

In some embodiments, the present invention is directed to a method of either of the previous two paragraphs, wherein the flame retardant-containing polyether polyol composition is combined with the polyisocyanate at a relative volume ratio of 1.5:1 to 1:1.5, such as 1.1:1 to 1:1.

In certain embodiments, the present invention is directed to a method of any of the previous three paragraphs, wherein the foam has a density, as determined by ASTM D-1622, of no more than 160 kg/m³, such as no more than 80 kg/m³, no more than 60 kg/m³, or, in some cases, no more than 50 kg/m³ or, in some cases, no more than 22.4 kg/m³ and, in some cases, at least 5 kg/m³, such as at least 6.4 kg/m³, such as at least 8 kg/m³ or, in some cases, at least 10 kg/m³, whereas in some embodiments, the foam is a low density foam having a density, as determined by ASTM D-1622, of 6.4 kg/m³ to 22.4 kg/m³, such as 6.4 kg/m³ to 8 kg/m³.

In some embodiments, the present invention is directed to a method of any of the previous four paragraphs, wherein the foam has an open cell content of at least 90%, measured according ASTM D6226.

In other embodiments, the present invention is directed to a method of any of the previous five paragraphs, wherein the foam has a Class B rating (flame spread index of 26-75), determined according to ASTM E 84 or, in other embodiments, the foam has a Class A rating (flame spread index of 0-25), determined according to ASTM E 84.

In still other embodiments, the present invention is directed to a method of any of the previous six paragraphs, wherein the foam passes the ACC 377, Appendix X test, even when the foam is not covered or coated, such as with an ignition barrier layer.

The following Examples are given as being illustrative of the present invention. All parts and percentages given in these Examples are parts by weight and percentages by weight, unless otherwise indicated.

EXAMPLES

Example 1: Preparation of the Polyol

A polyether polyol composition was prepared using the ingredients and amounts listed in Table 1. To prepare the polyether polyol composition, the reactor temperature was set to 50° C. and the reactor was charged with the water, KOH and sucrose. The reactor temperature was raised to 100° C. and the reactor pressure was vented to 5 psig. Both EO and PO were fed as a mixed feed at a rate sufficient to maintain the total reaction pressure between 30 and 45 psig. After completion of the EO and PO addition, the reaction mixture was cooled to 80° C. and the KOH was neutralized with 101% of the theoretical amount of 88% aqueous lactic acid. After neutralization, the reactor was charged with BHT and agitated for 30 minutes. Water was not removed from the polyol composition. Characteristics of the polyether polyol composition are set forth in Table 2.

TABLE 1

| Water (kg) | KOH[1] (kg) | Sucrose[2] (kg) | EO[3] (kg) | PO[4] (kg) | BHT[5] (kg) |
|---|---|---|---|---|---|
| 36.7 | 19.57 | 128.4 | 38.133 | 12.711 | 0.109 |

[1]Potassium Hydroxide, 45% in water, from Ashta Chemicals, Inc.
[2]Granulated sugar from Domino Sugar Corporation.
[3]Ethylene oxide from BASF Corporation.
[4]Propylene oxide from Lyondell Chemical Company.
[5]Butylated hydroxytoluene (food grade) from Evonik.

TABLE 2

| Sucrose Content[6] | Functionality[7] | OH#[8] | Water Content[9] | Viscosity (mPa · s)[10] | Gardner Color[11] |
|---|---|---|---|---|---|
| 71 | 6.8 | 700 | 16.8 | 5600 | 6 |

[6]calculated value (% by weight, based on the total weight of the polyol composition).
[7]arithmetically calculated functionality determined as described above.
[8]measured according to ASTM D4274-11.
[9]measured value by Karl-Fisher analysis similar to the method described in ASTM E203-08.
[10]measured at 25° C. according to ASTM D4878 using a Brookfield RV-DVII viscometer with the small sample adapter and a #21 spindle
[11]measured according to ASTM D1544

Example 2: Viscosity Evaluations

Figure 2:
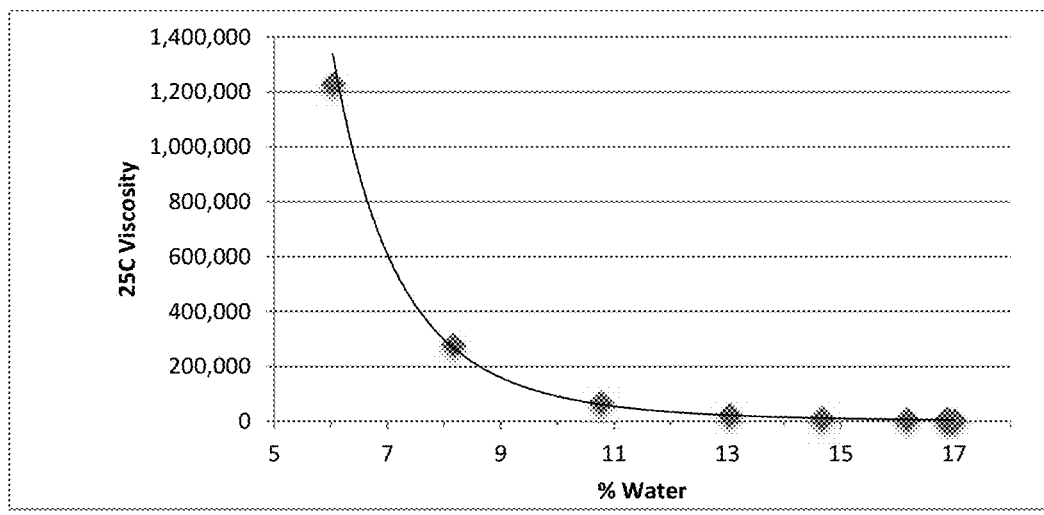
FIG. 2 is a graph of the viscosity (in mPa·s at 50° C.) of a polyether polyol composition produced as in Example 1 at various water contents (in % by weight of the polyether polyol composition).

The polyether polyol composition produced as described in Example 1 was heated to 100° C. and placed under increasing vacuum to remove the water. The vacuum was stopped and the pressure returned to atmospheric using nitrogen and a sample taken for water and viscosity analysis (at 25° C. and 50° C.) at several intervals. This process was repeated until the resultant polymer composition was too viscous to be able to be removed from the stripping vessel. Results are illustrated in FIGS. 1 and 2. Viscosity was measured according to ASTM D4878 using a Brookfield RV-DVII viscometer with the small sample adapter and a #21 spindle.

Example 3: Foam Formulations

A polyether polyol composition as described by Example 1 was used to prepare flame retardant-containing polyether polyol compositions using the ingredients and amounts (in weight %, based on the total weight of the polyol formulation) listed in Table 3.

TABLE 3

| Component | Foam 1 | Foam 2 |
|---|---|---|
| Polyether Polyol as Described by Example 1 | 37.00 | 34.00 |
| SURFACTANT 1[12] | 7.25 | 7.25 |
| Water | 12.00 | 11.5 |
| CATALYST 1[13] | 1.00 | 1.50 |
| CATALYST 2[14] | 2.00 | 5.00 |
| CATALYST 3[15] | 2.00 | 2.00 |
| FLAME RET. 1[16] | 18.00 | 18.00 |
| FLAME RET. 2[17] | 20.00 | 20.00 |
| SURFACTANT 2[18] | 0.75 | 0.75 |

[12]Tallow amine ethoxylate, commercially available as Surfonic® T-15 from Huntsman Corporation.
[13]N,N,N'-trimethyl-N'-hydroxyethyl-bisaminoethylether, commercially available as Jeffcat® ZF-10 from Huntsman Corporation.
[14]N,N-bis(3-dimethylaminopropyl)-N-isopropanolamine, commercially available as Jeffcat® ZR-50 from Huntsman Corporation.
[15]2-(2-dimethylaminoethoxy)ethanol, commercially available as Jeffcat® ZR-70 from Huntsman Corporation.
[16]halogenated aliphatic polyether diol, commercially available as Ixol® M 125 from Solvay Chemicals, Inc.
[17]Tris (1-chloro-2-propyl) phosphate.
[18]Silicone surfactant, commercially available as Silstab® 2760 from Siltech Corporation.

A test room having a height of 8 feet, a width of 8 feet and a depth of 12 feet was constructed from walls containing 2"×8" studs, spaced 24" on center and a ceiling using 2"×12" joists, spaced 24" on center, running parallel to the walls. The exterior of the studs and joists were covered with ⅝" thick gypsum board (Type X).

Polyurethane foams were produced from the compositions described above. To produce a foam having a density of about 0.5 lb/ft³, the flame retardant-containing polyether polyol composition was mixed with Mondur® MR-Light isocyanate (an aromatic polymeric isocyanate based on diphenylmethane-diisocyanate, NCO content >31.0 wt. %, average NCO equivalent weight of 132), at a 1:1 by volume ratio and sprayed at a process temperature of 120° F. (49° C.) and 1250 pounds per square inch (polyisocyanate) and 1150 pounds per square inch (polyol) dynamic mixing pressures. For testing according to ICC-ES AC377 Appendix X, the stud cavities were filled with 8 inches of foam and the joists with 12 inches of foam, untrimmed Foam was applied to the back corners of the room to meet the maximum allowable deviations described by ICC-ES AC377 Appendix X, Figure X3.

Foams were evaluated according to ASTM E 84 and ICC-ES AC377 Appendix X. Results are in Table 4.

TABLE 4

| Test | Foam 1 | Foam 2 |
|---|---|---|
| ASTM E 84 | | |
| Flame Spread Index | 15 | 15 |
| Smoke Developed Index | 450 | 600 |
| Time to Ignition | 3 seconds | 3 seconds |
| Time to Maximum Flame Spread | 29 seconds | 30 seconds |
| Maximum Temperature | 623° F. (328° C.) | 640° F. (338° C.) |
| Time to Maximum Temperature | 594 seconds | 580 seconds |
| ICC-ES AC377 Appendix X Flame Spread | Pass | Fail |
| Foam Ignition Time | 12 seconds | 3 seconds |
| Flame Time to Ceiling | 22 seconds | 8 seconds |
| Ceiling flash over | ~26 (slight) seconds | ~10 (total) seconds |
| Smoke Development | | |
| Time to heavy smoke | 26 seconds | 22 seconds |
| Time to moderate smoke | 40 seconds | N/A |
| Time to light gray smoke | 130 seconds | N/A |
| Flame Die Down Time | | |
| Flame time to 5 feet | 56 seconds | 43 seconds: failed |
| Flame time to 4 feet | 140 seconds | Flames out door - test stopped |
| Foam Burn Heat Release | | |
| Maximum heat release | ~70 kW | N/A |
| Total heat release | ~18 MJ | N/A |
| Max. foam thermocouple temp. | ~400° F. (204° C.) | N/A |

Example 4: Foam Formulations

A polyether polyol composition as described by Example 1 was used to prepare flame retardant-containing polyether polyol compositions using the ingredients and amounts (in weight %, based on the total weight of the polyol formulation) listed in Table 5.

TABLE 5

| Component | Foam 3 | Foam 4 | Foam 5 |
|---|---|---|---|
| Polyether Polyol Composition as Described by Example 1 | 22.00 | 24.75 | 24.75 |
| Sucrose | 13.00 | 10.00 | 10.00 |
| SURFACTANT 1[12] | 3.50 | 4.25 | 4.25 |
| Water | 13.00 | 13.00 | 13.00 |
| CATALYST 4[19] | 2.00 | 2.00 | 2.00 |
| CATALYST 5[20] | 6.00 | 6.00 | 6.00 |
| CATALYST 3[15] | 3.00 | 3.00 | 3.00 |

TABLE 5-continued

| Component | Foam 3 | Foam 4 | Foam 5 |
|---|---|---|---|
| FLAME RET. 3[21] | 20.00 | 18.00 | 18.00 |
| FLAME RET. 2[17] | 17.00 | 18.50 | 18.50 |
| SURFACTANT 3[22] | — | — | 0.50 |
| SURFACTANT 4[23] | 0.50 | 0.50 | — |

[19]Dabco ® NE310, an amine catalyst that promotes the urea (water-isocyanate) reaction, Air Products and Chemicals, Inc.
[20]tetramethyldipropylenetriamine, commercially available as Jeffcat ® Z-130 from Huntsman Corporation.
[21]halogenated aliphatic polyether diol, commercially available as Ixol ® B 251 from Solvay Chemicals, Inc.
[22]Silicone surfactant, commercially available as Tegostab ® B 8871 from Evonik Industries.
[23]Silicone surfactant, commercially available as Tegostab ® B 84710 from Evonik Industries.

A test room was constructed as in Example 3 except that the walls contained 2"×12" studs and the ceiling used 2"×16" joists.

Polyurethane foams were produced from the compositions described above. Foams were tested according to ASTM E 84. Foam 4 was tested according to ICC-ES AC377 Appendix X according to the procedure described in Example 3, except that the stud cavities were filled with 12 inches of foam and the joists with 16 inches of foam, untrimmed. To produce a foam having a density of about 0.5 lb/ft³, the flame retardant-containing polyether polyol compositions were mixed with Mondur® MR-Light isocyanate at a 1:1 by volume ratio and sprayed at a process temperature of 120° F. (49° C.) and 1250 pounds per square inch (polyisocyanate) and 1150 pounds per square inch (polyol) dynamic mixing pressures. Results are in Table 6.

TABLE 6

| Test | Foam 3 | Foam 4 | Foam 5 |
|---|---|---|---|
| ASTM E 84 | | | |
| Flame Spread Index | 15 | 15 | 15 |
| Smoke Developed Index | 400 | 400 | 400 |
| Time to Ignition | 2 seconds | 2 seconds | 2 seconds |
| Time to Maximum Flame Spread | 4 seconds | 29 seconds | 17 seconds |
| Maximum Temperature | 636° F. (336° C.) | 626° F. (330° C.) | 620° F. (327° C.) |
| Time to Maximum Temperature | 590 seconds | 566 seconds | 599 seconds |
| ICC-ES AC377 Appendix X | | | |
| Flame Spread | — | Pass | — |
| Foam Ignition Time | — | 11 seconds | — |
| Flame Time to Ceiling | — | 20 seconds | — |
| Ceiling flash over | — | Not apparent | — |
| Smoke Development | | | |
| Time to heavy smoke | — | 29 seconds | — |
| Time to moderate smoke | — | 75 seconds | — |
| Time to light gray smoke | — | 120 seconds | — |
| Flame Die Down Time | | | |
| Flame time to 5 feet | — | 48 seconds | — |
| Flame time to 4 feet | — | 130 seconds | — |
| Foam Burn Heat Release | | | |
| Maximum heat release | — | ~75 kW | — |
| Total heat release | — | ~17 MJ | — |
| Max. foam thermocouple temp. | — | ~410° F. (210° C.) | — |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

What is claimed is:

1. A polyether polyol composition comprising:
   (a) at least 10 percent by weight, based on the total weight of the composition, of water; and
   (b) a polyether polyol that is the reaction product of: (i) sucrose; and (ii) an alkylene oxide; wherein (i) and (ii) are used at a mole ratio of alkylene oxide to sucrose of 1:1 to 3:1, the polyether polyol has an arithmetically calculated functionality of 5.2 to 7.7, sucrose is used in an amount of 50 to 90 percent by weight, based on the total weight of sucrose and alkylene oxide used to make the polyether polyol, and the alkylene oxide comprises ethylene oxide and propylene oxide, wherein the weight ratio of ethylene oxide to propylene oxide is at least 1:1.

2. The polyether polyol composition of claim 1, wherein the mole ratio of alkylene oxide to sucrose is 2:1 to 3:1.

3. The polyether polyol composition of claim 1, wherein the weight ratio of ethylene oxide to propylene oxide is at least 2:1 and no more than 5:1.

4. The polyether polyol composition of claim 1, wherein the polyether polyol has a hydroxyl number of at least 400 and no more than 1,000, measured according to ASTM D4274-11.

5. The polyether polyol composition of claim 1, wherein the polyether polyol has an arithmetically calculated functionality of at least 6.0 and no more than 7.0.

6. The polyether polyol composition of claim 1, wherein the composition does not include a flame retardant.

7. The polyether polyol composition of claim 1, wherein sucrose is used in an amount of 60 to 80 percent by weight, based on the total weight of sucrose and alkylene oxide used to make the polyether polyol.

8. The polyether polyol composition of claim 1, further comprising a glycol that is the reaction product of water and an alkylene oxide.

9. A method of making a flame retardant-containing polyether polyol composition, comprising combining the polyether polyol composition of claim 1 with a flame-retardant.

10. A polyether polyol composition comprising:
    (a) at least 10 percent by weight, based on the total weight of the composition, of water; and
    (b) a polyether polyol that is the reaction product of: (i) sucrose; and (ii) an alkylene oxide; wherein (i) and (ii) are used at a mole ratio of alkylene oxide to sucrose of 1:1 to 3:1, the polyether polyol has an arithmetically calculated functionality of 5.2 to 7.7, and sucrose is used in an amount of 50 to 90 percent by weight, based on the total weight of sucrose and alkylene oxide used to make the polyether polyol, and wherein the composition has a viscosity of at least 1,000 mPa·s and not more than 10,000 mPa·s, when measured at 25° C.

according to ASTM D4878 using a Brookfield RV-DVII viscometer with the small sample adapter and a #21 spindle.

11. A method of making a flame retardant-containing polyether polyol composition, comprising combining the polyether polyol composition of claim 10 with a flame-retardant.

12. A flame retardant-containing polyether polyol composition comprising:
   (a) at least 10 percent by weight water, based on the total weight of the flame retardant-containing polyether polyol composition;
   (b) a polyether polyol that is the reaction product of:
      (i) sucrose; and
      (ii) an alkylene oxide;
      wherein (i) and (ii) are used at a mole ratio of alkylene oxide to sucrose of 1:1 to 3:1, the polyether polyol has an arithmetically calculated functionality of at least 5.2 and no more than 7.7, and sucrose is used in an amount of 50 to 90 percent by weight, based on the total weight of sucrose and alkylene oxide used to make the polyether polyol; and
   (c) a flame retardant composition.

13. The flame retardant-containing polyether polyol composition of claim 12, wherein the polyether polyol (b) is present in an amount of at least 10 percent by weight and no more than 35 percent by weight, based on the total weight of the flame retardant-containing polyether polyol composition.

14. The flame retardant-containing polyether polyol composition of claim 12, wherein the flame retardant composition comprises (i) a brominated flame retardant and (ii) a phosphonated flame retardant.

15. The flame retardant-containing polyether polyol composition of claim 14, wherein the brominated flame retardant comprises a brominated polyether polyol of the general formula:

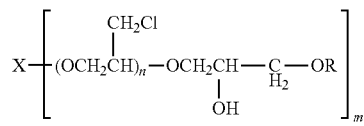

in which n is a number of 0 to 7, m is a number of 2 to 3; X is a saturated or unsaturated brominated polyol residue; and R is hydrogen or an alkyl group having 1 to 5 carbon atoms.

16. The flame retardant-containing polyether polyol composition of claim 15, wherein the relative weight ratio of the brominated flame retardant and the phosphonated flame retardant is within the range of 1:4 to 4:1.

17. The flame retardant-containing polyether polyol composition of claim 15, wherein the relative weight ratio of the brominated flame retardant and phosphonated flame retardant is within the range of 1:1.5 to 1.5:1.

18. The flame retardant-containing polyether polyol composition of claim 14, wherein the total amount of flame retardant in the flame retardant-containing polyether polyol composition is at least 20 percent by weight and no more than 50 percent by weight, based on the total weight of the flame retardant-containing polyether polyol composition.

19. The flame retardant-containing polyether polyol composition of claim 12, further comprising raw sucrose.

20. The flame retardant-containing polyether polyol composition of claim 19, wherein
   the polyether polyol and raw sucrose are present in the flame retardant-containing polyether polyol composition at a relative weight ratio of at least 2:1.

21. The flame retardant-containing polyether polyol composition of claim 12, wherein sucrose is used in an amount of 60 to 80 percent by weight, based on the total weight of sucrose and alkylene oxide used to make the polyether polyol.

22. The flame retardant-containing polyether polyol composition of claim 12, further comprising a glycol that is the reaction product of water and an alkylene oxide.

* * * * *